US011902894B2

United States Patent
Ratasuk et al.

(10) Patent No.: US 11,902,894 B2
(45) Date of Patent: Feb. 13, 2024

(54) DETERMINING RADIO FREQUENCY (RF) CONDITIONS USING SENSING INFORMATION

(71) Applicant: Nokia Technologies Oy, Espoo (FI)

(72) Inventors: Rapeepat Ratasuk, Inverness, IL (US); Ryan Keating, Chicago, IL (US); Amitabha Ghosh, Buffalo Grove, IL (US); Jie Chen, Naperville, IL (US); Athul Prasad, Naperville, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 209 days.

(21) Appl. No.: 17/117,865

(22) Filed: Dec. 10, 2020

(65) Prior Publication Data

US 2022/0191782 A1 Jun. 16, 2022

(51) Int. Cl.
*H04W 52/02* (2009.01)

(52) U.S. Cl.
CPC ... *H04W 52/0206* (2013.01); *H04W 52/0212* (2013.01); *H04W 52/0225* (2013.01)

(58) Field of Classification Search
CPC ......... H04W 52/0206; H04W 52/0212; H04W 52/0225; H04W 4/029; H04W 24/02; H04W 4/50
See application file for complete search history.

(56) References Cited

U.S. PATENT DOCUMENTS

| | | |
|---|---|---|
| 8,787,944 B2 | 7/2014 | Smith |
| 9,121,924 B2 | 9/2015 | Ng et al. |
| 10,142,793 B2 | 11/2018 | Pandharipande et al. |
| 2012/0287875 A1 | 11/2012 | Kim et al. |
| 2014/0141801 A1 | 5/2014 | Kummetz |
| 2014/0315593 A1 | 10/2014 | Vrzic et al. |

(Continued)

FOREIGN PATENT DOCUMENTS

| | | |
|---|---|---|
| WO | 2019/086309 A1 | 5/2019 |
| WO | 2020/146739 A1 | 7/2020 |

(Continued)

OTHER PUBLICATIONS

International Search Report and Written Opinion received for corresponding Patent Cooperation Treaty Application No. PCT/EP2021/076031, dated Dec. 23, 2021, 12 pages.

(Continued)

*Primary Examiner* — Ricky Q Ngo
*Assistant Examiner* — Kabir U Jahangir
(74) *Attorney, Agent, or Firm* — SQUIRE PATTON BOGGS (US) LLP (57) ABSTRACT

Certain example embodiments provide systems, methods, apparatuses, and computer program products for determining radio frequency (RF) conditions using sensing information. A network node may construct a map of RF conditions associated with location information within its coverage area. The network node may configure a radio resource control (RRC)-connected UE to operate in an RF sensing mode. The network node may obtain a positioning of the UE from a sensing node. The network node may determine the RF conditions of the UE based on its position using the map.

19 Claims, 5 Drawing Sheets

(56) References Cited

U.S. PATENT DOCUMENTS

| | | |
|---|---|---|
| 2014/0323119 A1 | 10/2014 | Bader |
| 2015/0327328 A1 | 11/2015 | Novak et al. |
| 2016/0063528 A1* | 3/2016 | Zhang ................ G06Q 30/0207 |
| | | 705/14.1 |
| 2016/0241348 A1 | 8/2016 | Zirwas et al. |
| 2017/0080909 A1* | 3/2017 | Kim ..................... B60T 17/221 |
| 2018/0343635 A1 | 11/2018 | Edge et al. |
| 2019/0182665 A1 | 6/2019 | Edge |
| 2019/0230619 A1 | 7/2019 | Cui et al. |
| 2019/0297595 A1 | 9/2019 | Sirotkin et al. |
| 2020/0064437 A1 | 2/2020 | Hughes et al. |
| 2020/0229206 A1* | 7/2020 | Badic ................... H04W 40/24 |
| 2020/0264261 A1 | 8/2020 | Akkarakaran et al. |
| 2020/0296680 A1 | 9/2020 | Akkarakaran et al. |
| 2021/0111767 A1* | 4/2021 | Benjebbour .......... H04W 16/28 |
| 2022/0026550 A1* | 1/2022 | Park ..................... H04B 17/309 |

FOREIGN PATENT DOCUMENTS

| | | |
|---|---|---|
| WO | 2020/234902 A1 | 11/2020 |
| WO | WO-2022109772 A1 * | 6/2022 |

OTHER PUBLICATIONS

Zhao et al., "mID: Tracking and Identifying People with Millimeter Wave Radar", 15th International Conference on Distributed Computing in Sensor Systems (DCOSS), May 29-31, 2019, pp. 33-40.

Sarieddeen et al., "Next Generation Terahertz Communications: A Rendezvous of Sensing, Imaging, and Localization", IEEE Communications Magazine, vol. 58, No. 5, May 2020, pp. 69-75.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

Barneto et al., "Full-Duplex OFDM Radar with LTE and 5G NR Waveforms: Challenges, Solutions, and Measurements", IEEE Transactions on Microwave Theory and Techniques, vol. 67, No. 10, Oct. 2019, pp. 4042-4054.

El-Absi et al., "High-Accuracy Indoor Localization Based on Chipless RFID systems at THz Band", IEEE Access, vol. 6, Sep. 24, 2018, pp. 54355-54368.

"3rd Generation Partnership Project; Technical Specification Group Radio Access Network; NG-RAN; NR Positioning Protocol A (NRPPa) (Release 16)", 3GPP TS 38.455, V16.1.0, Sep. 2020, pp. 1-147.

Premalatha et al., "Catching Target Mobile Node using Time-of-arrival Measurement in Wireless Sensor Networks", International Confernce on Innovation Information in Computing Technologies, Feb. 19-20, 2015, 6 pages.

Liang et al., "Deep Learning and Compressive Sensing-Based CSI Feedback in FDD Massive MIMO Systems", IEEE Transactions on Vehicular Technology, vol. 69, No. 8, Aug. 2020, pp. 9217-9222.

* cited by examiner

DETERMINING RADIO FREQUENCY (RF) CONDITIONS USING SENSING INFORMATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for determining radio frequency (RF) conditions using sensing information.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a network node from a sensing node, location information associated with a user equipment. The method may include determining one or more radio frequency parameters for the user equipment based on the location information and a map of one or more radio frequency conditions in at least one cell. The method may include communicating with the user equipment using the one or more determined radio frequency parameters.

In a variant, the method may further include constructing the map of the one or more radio frequency conditions. In a variant, the constructing of the map may further include constructing the map based on one or more previous reports from the user equipment or one or more other user equipment. In a variant, the method may further include periodically updating or checking the map based on feedback information from the user equipment or one or more other user equipment. In a variant, the method may further include configuring the user equipment to operate in a sensing mode. In a variant, the method may further include reverting the user equipment from operating in the sensing mode based on a change in a network environment.

In a variant, the method may further include periodically validating the one or more radio frequency parameters for the user equipment. In a variant, the method may further include revalidating an association between sensing information and the user equipment. In a variant, the revalidating of the association may further include revalidating the association if a distance between the user equipment and another sensed object fails to satisfy a threshold. In a variant, the method may further include adjusting the one or more radio frequency parameters based on one or more parameters specific to the user equipment. In a variant, the adjusting of the one or more radio frequency parameters may further include adjusting the one or more radio frequency parameters based on capability information associated with the user equipment. In a variant, the adjusting of the one or more radio frequency parameters may further include adjusting the one or more radio frequency parameters based on a sensed orientation and movement of the user equipment. In a variant, the adjusting of the one or more radio frequency parameters may further include adjusting the one or more radio frequency parameters based on object or reflection detections. In a variant, the method may further include tracking the user equipment or one or more other user equipment that are operating in an idle and/or an inactive state.

According to a second embodiment, a method may include receiving, by a user equipment from a network node, a configuration associated with operating in a sensing mode. The method may include communicating with the network node using one or more determined radio frequency parameters that are based on location information associated with the user equipment and a map of one or more radio frequency conditions in at least one cell. The method may include reverting from operating in the sensing mode.

In a variant, the reverting may include reverting from operating in the sensing mode based on at least one of: signaling from the network node that is based on a measurement report from the user equipment or one or more other user equipment, or satisfaction of one or more criteria configured for the user equipment. In a variant, the user equipment may send radio frequency sensing mode validation feedback and/or report to the network node.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining radio frequency (RF) conditions using sensing information is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Certain aspects of NR may use complementary sensing information to improve wireless communication in millimetre wave (mmWave) or terahertz (THz) spectrum. Sensing information (e.g., radar) in mmWave or THz spectrum can be used to map a deployment area and track users or objects in the deployment area. The sensing may be passive and may not have to have any feedback or transmission from the sensed users. In the communication domain, sensing can be used, e.g., to determine the location of a UE, to determine the orientation of the UE, to track the UE within the cell, for handover, for blockage detection and/or recovery, vehicle-to-vehicle (V2V) communications, etc. In some examples, the network may track the user and may initiate a handover without any feedback and/or measurement report from the user.

In a cellular system, the network may have to know the radio condition (e.g., preferred beam, channel quality index (CQI), channel state information (CSI), reference signal received power (RSRP), etc.) at the UE for efficient operation. Typically, this may be obtained through the following process: (1) network transmits reference signals; (2) UE performs measurements on the reference signals; and (3) UE reports channel state information and/or radio conditions to the network. Alternately, the network may instruct the UE to transmit reference signals for measurements by the network. Such processes may have high overhead (both the reference signals and feedback can consume significant resources), may have meaningful power consumption at the UE, and may generate downlink (DL) or uplink (UL) interference to nearby systems. As such, there may be problems related to how to utilize sensing information to determine the RF condition of a UE (e.g., preferred beam, CQI, CSI, RSRP, signal-to-noise ratio, etc.) so that the overhead can be minimized, with reduced or no feedback from the UE.

Some embodiments described herein may provide for determining RF conditions using sensing information. A network node (e.g., a gNB) may construct a map of RF conditions (or one or more maps for one or more RF conditions) associated with location information (and/or positioning information, which may be interchangeable with location information) within its coverage area. The network node may configure a radio resource control (RRC)-connected UE (e.g., a UE in an RRC connected mode) into an RF sensing mode. In this mode, the UE may have reduced measurements and measurement reports (e.g., the UE may be configured with a CSI-reference signal (CSI-RS) configuration, but may just perform measurements on-demand) The network node may obtain a positioning of the UE from a sensing node.

The network node may determine the RF conditions of the UE based on its position using the map. For example, the network node may continually track the UE and may determine RF conditions using periodic positioning information. The network node may periodically, or based on a trigger, revalidate the association of the sensing information with the UE.

The network node may periodically validate RF information for the UE. The validation can be performed for a specific UE or using a reference UE which may validate the RF map for a portion (or all) of the cell. The network node may continue to track the UE if it moves into an RRC inactive or idle mode. For example, the paging beam or early data transmission (EDT) and/or small data transmission (SDT) modulation coding scheme (MCS) may be selected based on RF conditions. Additionally, or alternatively, the network node may determine if the UE has left the cell.

Figure 1:
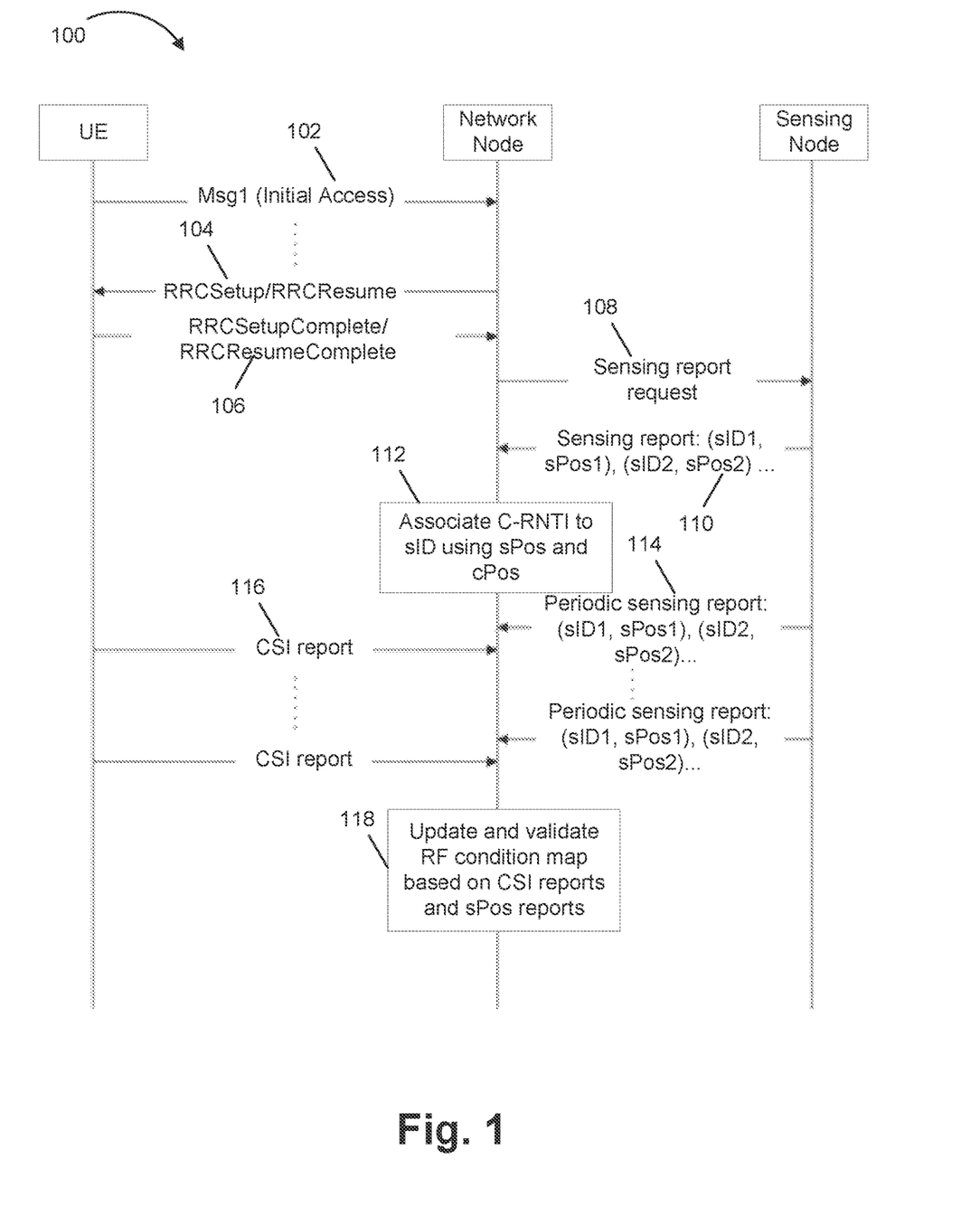
FIG. 1 illustrates an example signal diagram for map generation and update, according to some embodiments.

FIG. 1 illustrates an example signal diagram 100 for map generation and update, according to some embodiments. As illustrated, the example 100 includes a UE, a network node (e.g., a gNB), and a sensing node. As illustrated at 102, the UE may send, to the gNB, a message 1 of an RRC process (Msg1) for initial access. The gNB may, at 104, send an RRC setup and/or an RRC resume message to the UE. As illustrated at 106, the UE may send, to the gNB, an RRC setup complete and/or an RRC resume complete message.

As illustrated at 108, the gNB may send, to the sensing node, a sensing report request, and the sensing node may send, to the UE, a sensing report, at 110. The sensing report may include one or more identifiers for one or more sensed objects (sID) and positioning information from a sensing node (sPos) for various sensed objects. As illustrated at 112, the gNB may associate a cell radio network temporary identifier (C-RNTI) to a sID using the sPos and positioning information from a communication node (cPos), such as a UE. As illustrated at 114, the sensing node may periodically send, to the network node, a sensing report. As illustrated at 116, the UE may send, to the network node, a set of CSI reports associated with the periodic sensing reports. As illustrated at 118, the network node may update and validate the RF condition map based the CSI reports at 116 and sPos reports at 114.

As described above, FIG. 1 is provided as an example. Other examples are possible, according to some embodiments.

Figure 2:
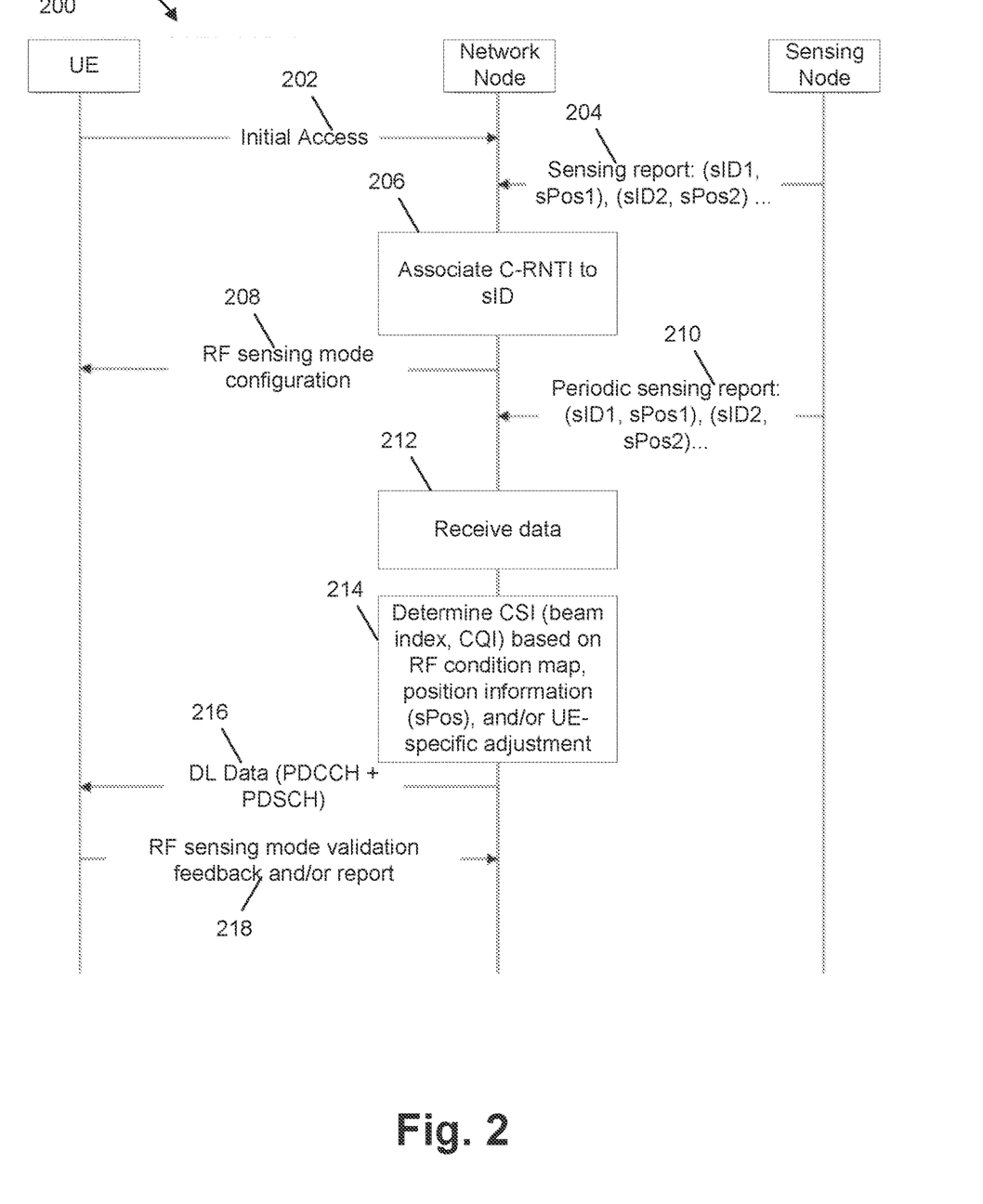
FIG. 2 illustrates an example signal diagram for configuring a user equipment (UE) to operate in a sensing mode, according to some embodiments.

FIG. 2 illustrates an example signal diagram 200 for configuring a user equipment (UE) to operate in a sensing mode, according to some embodiments. As illustrated in FIG. 2, the example 200 may include a UE, a network node (e.g., a gNB), and a sensing node. As illustrated at 202, the UE may send, to the network node, an initial access message. The sensing node may send, at 204, a sensing report. The network node may associate a C-RNTI to a sID, at 206.

As illustrated at 208, the network node may send, to the UE, an RF sensing mode configuration (e.g., for UE operation in the RF sensing mode). The sensing node may, at 210, periodically send a sensing report to the network node. As illustrated at 212, the network node may receive data (e.g., control messages, application data, web page data, video data, text data, etc.) to send to the UE. As illustrated at 214, the network node may determine a CSI (e.g., beam index, channel quality indicator (CQI), signal-to-noise ratio), for scheduling and transmission of data to the UE, based on an RF condition map, position information (sPos), and/or UE-specific adjustments. UE-specific adjustments may include adjustments to a CSI obtained for a UE from a map based on differences (e.g., in capability, type, etc.) between the UE and another UE for which the map was previously generated, as described elsewhere herein. The network node may send, at 216, DL data (e.g., on physical downlink control channel (PDCCH) and/or physical downlink shared channel (PDSCH)) to the UE. As illustrated at 218, the UE may send, to the network node, RF sensing mode validation feedback and/or report (e.g., indicating that UE is operating in the sensing mode, or information related to the operation in the sensing mode).

As indicated above, FIG. 2 is provided as an example. Other examples are possible, according to some embodiments.

Figure 3:
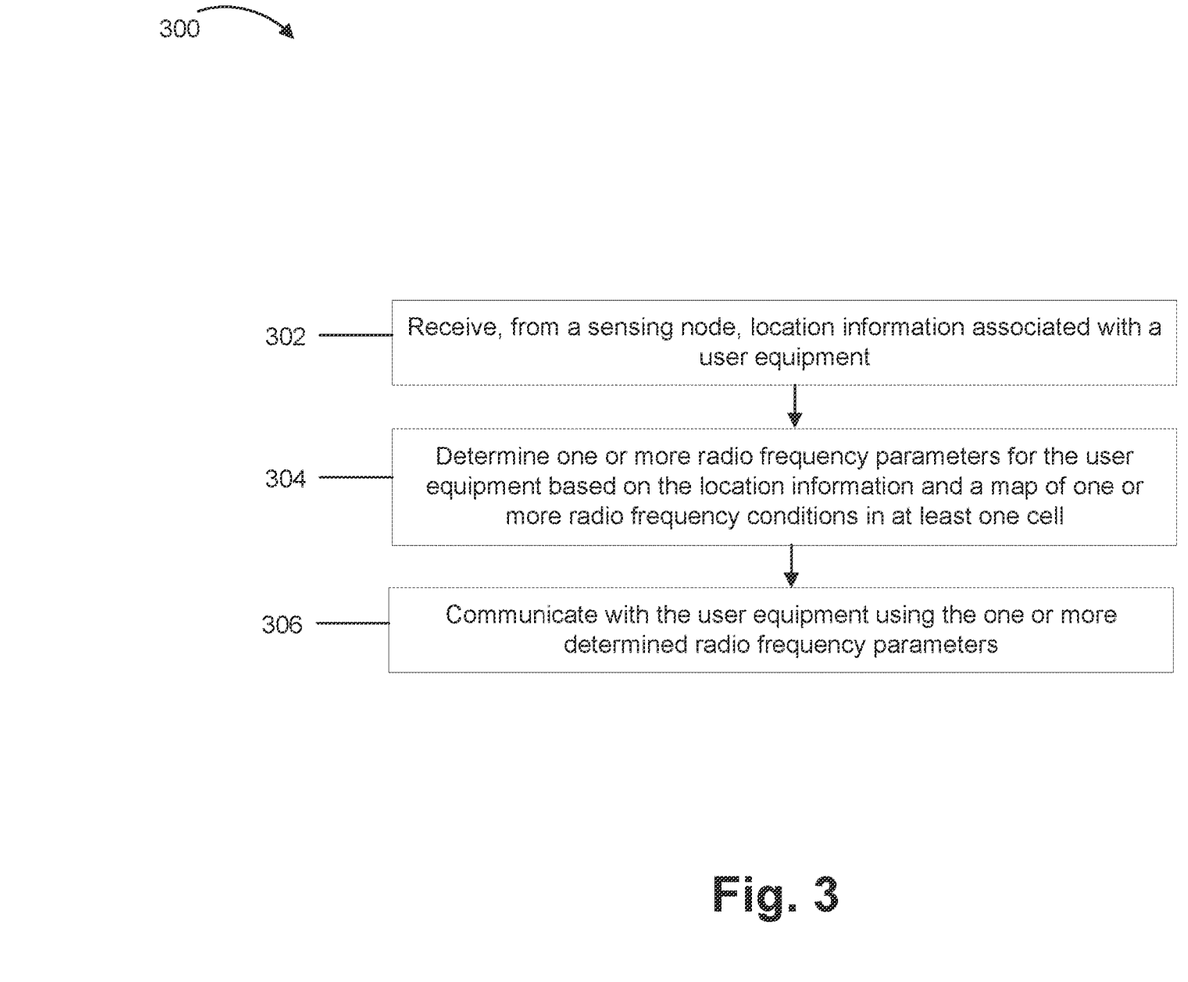
FIG. 3 illustrates an example flow diagram of a method, according to some embodiments.

As illustrated in FIGS. 2 and 3 above, or in connection with certain embodiments of those Figs., the network node may perform certain operations. The network node (e.g., a gNB) may construct a map of RF conditions with location information within its coverage area. The network node may construct different maps for different RF conditions, may construct a single map for multiple RF conditions, and/or the like. This may be performed using past reports from UEs. In certain embodiments, the reports may be provided by a single UE or by multiple UEs. Additionally, or alternatively, the UE performing the sensing and/or communicating may not provide a report, in certain embodiments. The map may be updated and/or checked periodically via feedback information from the UE. Additionally, or alternatively, some UEs may be requested to report RF conditions (e.g., during map update due to a change in environment or for a location with limited input). A minimization of drive test procedure may be used where, e.g., a UE can be configured for measurements, then triggered by the network node to perform measurements as needed. In certain embodiments, stationary UEs may be asked to provide periodic reports for map validation. The construction of the map may be performed at individual network nodes or by a core network element (e.g., a location server, a location management function (LMF) implemented in a radio access network (RAN) or core network) which may collect information from the network nodes.

The network node may configure an RRC-connected UE to operate in the RF sensing mode. In this mode, the UE may have reduced measurements and measurement reports (e.g., the UE may be configured with a CSI-RS configuration but may just perform measurements on-demand) The network node and the UE may revert out of the sensing mode due to a change in the network environment. For example, the network node may activate the UE to operate out of the RF sensing mode if a new object and/or reflector is detected through sensing. The network may optionally turn off one or more RF sensing modes for one or more UEs through a broadcast signal.

The network node may obtain a position of the UE from a sensing node. After this, the network node may determine RF conditions of the UE based on its position using the map. In certain embodiments, the network node may track (e.g., periodically or continuously) the UE and may determine RF conditions using periodic positioning information from a sensing node. The sensing node may be co-located or integrated into the network node, or separate from the network node.

The network node may periodically validate RF information for the UE. This may be performed implicitly based on active data transmission to check that the RF condition determined from the map is correct (e.g., the beam may be correct based on a received signal-to-interference-plus-noise ratio (SINR) for uplink (UL) transmission, or hybrid automatic repeat request (HARQ) acknowledgement (ACK) or negative ACK (NACK) feedback for downlink (DL) transmission. Additionally, or alternatively, or based on an implicit determination of change in the RF conditions, the network node may request aperiodic (e.g., on-demand) measurement reports from the UE. Validation may be performed for a specific UE or using a reference or representative UE which validates the RF map for one or more portions of the cell. For example, a mobile UE may be configured as a reference UE by the network node and measurements collected from this reference UE may be used to validate RF conditions of other UEs in the cell or accuracy of the RF map.

The network node may periodically, or based on a trigger, revalidate the association of the sensing information with the UE. The network node may be triggered to perform the revalidation if the distance between the UE and another sensed object reduces below a threshold value, e.g., depending on the resolution of positioning information. Adjustment to an RF condition determined from the map can be performed by the network based on UE capability information (e.g., based on a number of antennas and/or panels). In certain embodiments, the network node may maintain different maps based on a UE capability. Additionally, or alternatively, adjustment to an RF condition can be performed by the network based on sensed UE orientation and movement (e.g., hand movement). Additionally, or alternatively, adjustment to an RF condition can be performed by the network based on object and/or reflection detections (e.g., a new parked car is sensed in the cell). The RF condition that can be determined from this method may include beam information including the best beams or beam pairs or beam groups for joint transmission. Additionally, or alternatively, an RF condition may include CQI and/or signal-to-noise ratio (SNR) associated with individual beams or beam pairs or beam groups. Additionally, or alternatively, an RF condition may include RSRP (e.g., triggering for radio resource management (RRM) measurements, triggering for handover, and/or dual connectivity). Additionally, or alternatively, an RF condition may include a reference signal received quality (RSRQ).

FIG. 3 illustrates an example flow diagram of a method 300, according to some embodiments. For example, FIG. 3 may illustrate example operations of a network node (e.g., apparatus 10 illustrated in, and described with respect to, FIG. 5a). Some of the operations illustrated in FIG. 3 may be similar to some operations shown in, and described with respect to, FIGS. 1 and 2, or elsewhere herein.

In an embodiment, the method may include, at 302, receiving, from a sensing node, location information associated with a user equipment. The method may include, at 304, determining one or more radio frequency parameters for the user equipment based on the location information and a map of one or more radio frequency conditions in at least one cell. The method may include, at 306, communicating with the user equipment using the one or more determined radio frequency parameters.

The method illustrated in FIG. 3 may include one or more additional aspects described below or elsewhere herein. In some embodiments, the method 300 may further include constructing the map of the one or more radio frequency conditions. In some embodiments, the constructing of the map may further include constructing the map based on one or more previous reports from the user equipment or one or more other user equipment. In some embodiments, the method 300 may further include periodically updating or checking the map based on feedback information from the user equipment or one or more other user equipment. In some embodiments, the method 300 may further include configuring the user equipment to operate in a sensing mode. In some embodiments, the method 300 may further include reverting the user equipment from operating in the sensing mode based on a change in a network environment.

In some embodiments, the method may further include periodically validating the one or more radio frequency parameters for the user equipment. In some embodiments, the method may further include revalidating an association between sensing information and the user equipment. In some embodiments, the revalidating of the association may further include revalidating the association if a distance between the user equipment and another sensed object fails to satisfy a threshold. In some embodiments, the method 300 may further include adjusting the one or more radio frequency parameters based on one or more parameters specific to the user equipment. In some embodiments, the adjusting of the one or more radio frequency parameters may further include adjusting the one or more radio frequency parameters based on capability information associated with the user equipment. In some embodiments, the adjusting of the one or more radio frequency parameters may further include adjusting the one or more radio frequency parameters based on a sensed orientation and movement of the user equipment. In some embodiments, the adjusting of the one or more radio frequency parameters may further include adjusting the one or more radio frequency parameters based on object or reflection detections. In some embodiments, the method may further include tracking the user equipment or one or more other user equipment that are operating in an idle and/or an inactive state.

As described above, FIG. 3 is provided as an example. Other examples are possible according to some embodiments.

Figure 4:
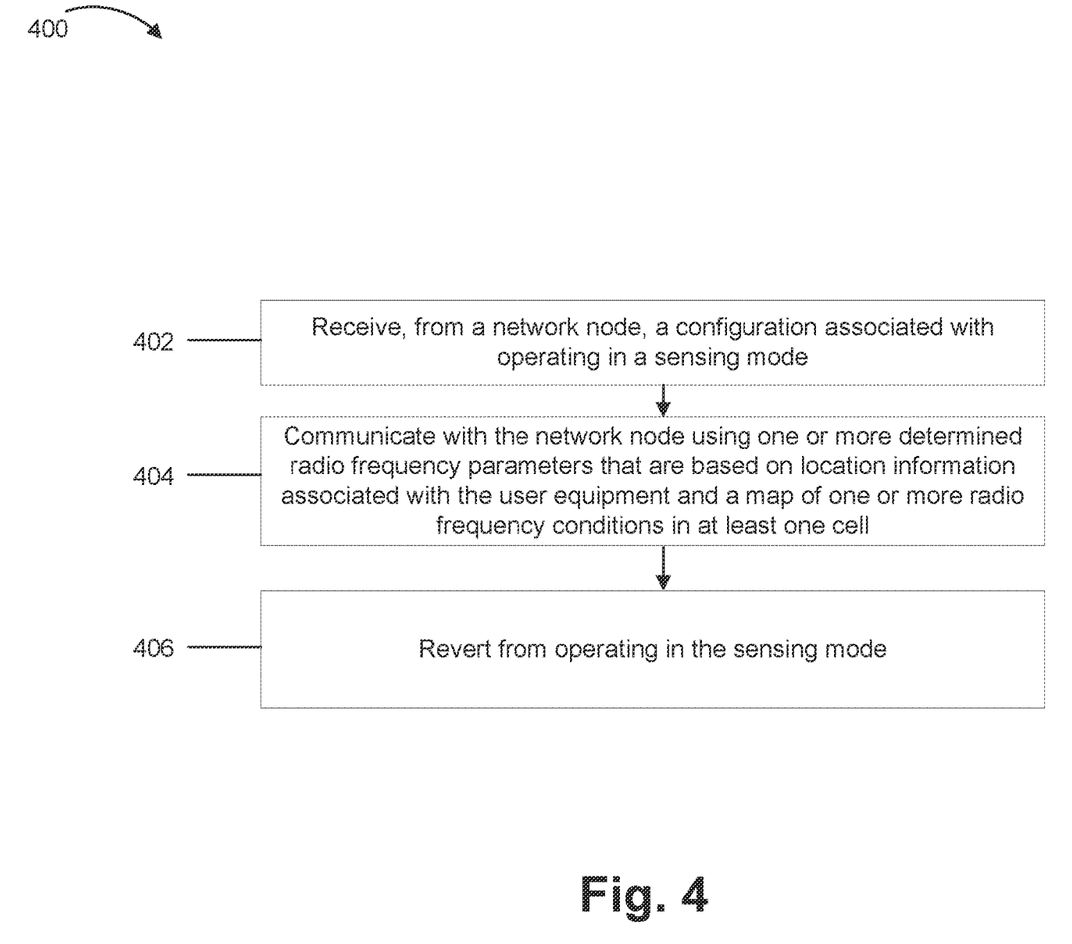
FIG. 4 illustrates an example flow diagram of a method, according to some embodiments.

FIG. 4 illustrates an example flow diagram of a method 400, according to some embodiments. For example, FIG. 4 may illustrate example operations of a UE (e.g., apparatus 20 illustrated in, and described with respect to, FIG. 5b). Some of the operations illustrated in FIG. 4 may be similar to some operations shown in, and described with respect to, FIGS. 1 and 2, or elsewhere herein.

In an embodiment, the method may include, at 402, receiving, from a network node, a configuration associated with operating in a sensing mode, for example, in a manner similar to that at 208 of FIG. 2. In an embodiment, the method may include, at 404, communicating with the network node using one or more determined radio frequency parameters that are based on location information associated with the user equipment and a map of one or more radio frequency conditions in at least one cell. In an embodiment, the method may include, at 406, reverting from operating in the sensing mode. The method illustrated in FIG. 4 may include one or more additional aspects described below or elsewhere herein. In some embodiments, the reverting at 406 may include reverting from operating in the sensing mode based on at least one of: signaling from the network node that is based on a measurement report from the apparatus or one or more user equipment (e.g., the network may directly instruct the UE to revert from the sensing mode), or satisfaction of one or more criteria configured for the apparatus (e.g., the criteria may include an RSRP change by a threshold). In some embodiments, the user equipment may send radio frequency sensing mode validation feedback and/or report to the network node, for example, in a manner similar to that at 218 of FIG. 2.

As described above, FIG. 4 is provided as an example. Other examples are possible according to some embodiments.

Figure 5A:
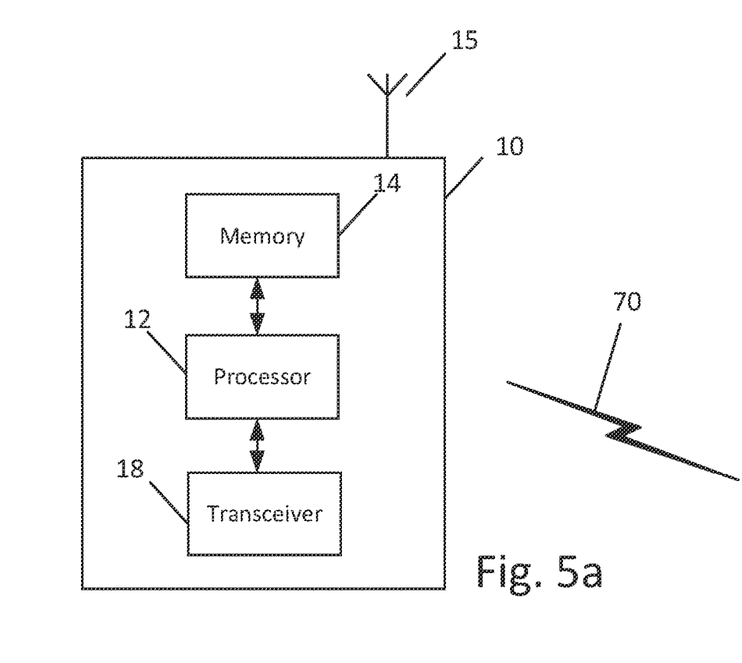
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a network node, sensing node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5*a*.

As illustrated in the example of FIG. 5*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, sensing node, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3. For instance, apparatus 10 may be controlled by memory 14 and processor 12 to perform the method of FIG. 3.

Figure 5B:
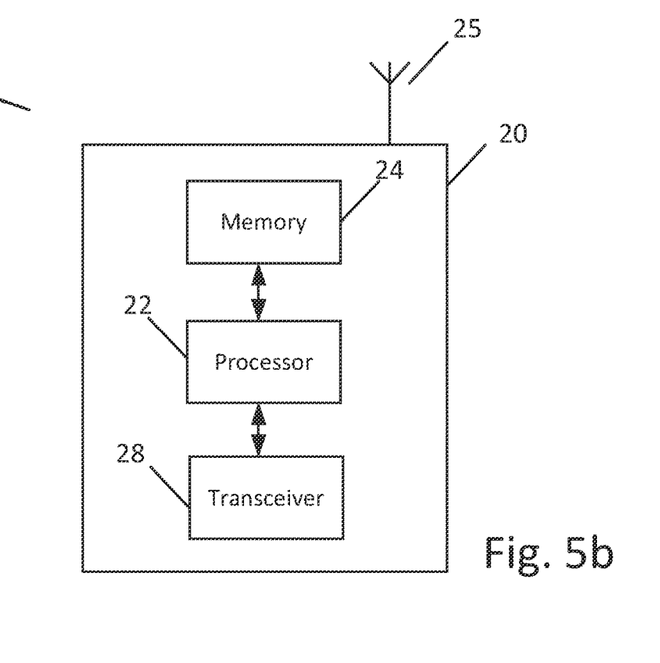
FIG. 5b illustrates an example block diagram of an apparatus, according to another embodiment.

FIG. 5*b* illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, communication node, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-3.

In some embodiments, an apparatus (e.g., apparatus 10 and/or apparatus 20) may include means for performing a method or any of the variants discussed herein, e.g., a method described with reference to FIG. 3. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reduction in overhead related to utilizing sensing information to determine the RF condition of a UE. In addition, certain embodiments may reduce power consumption of a UE. Accordingly, the use of some example embodiments results in improved functioning of communications networks and their nodes and, therefore constitute an improvement at least to the technological field of sensing in a cell, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

C-RNTI Cell Radio Network Temporary Identifier
DL Downlink
gNB 5G Base Station
LMF Location Management Function
NR New Radio (5G)
RS Reference Signal
RSRP Reference Signal Received Power
UE User Equipment
UL Uplink

We claim:

1. A method, comprising:
receiving, by a network node from a sensing node, location information determined by the sensing node and associated with a user equipment;
determining one or more radio frequency parameters for the user equipment based on the location information and a map of one or more radio frequency conditions in at least one cell;
communicating with the user equipment using the one or more determined radio frequency parameters; and
periodically validating the one or more radio frequency parameters for the user equipment using radio frequency information from at least one other user equipment located within a same cell as the user equipment.

2. The method according to claim 1, further comprising: constructing the map of the one or more radio frequency conditions.

3. The method according to claim 2, wherein the constructing of the map further comprises:
constructing the map based on one or more previous reports from the user equipment or one or more other user equipment.

4. The method according to claim 1, further comprising:
periodically updating or checking the map based on feedback information from the user equipment or one or more other user equipment.

5. The method according to claim 1, further comprising: configuring the user equipment to operate in a sensing mode.

6. The method according to claim 5, further comprising: reverting the user equipment from operating in the sensing mode based on a change in a network environment.

7. The method according to claim 1, further comprising: tracking the user equipment or one or more other user equipment that are operating in an idle or inactive state.

8. An apparatus, comprising:
at least one processor; and
at least one memory including computer program code, wherein the at least one memory and the computer program code are configured to, with the at least one processor, cause the apparatus at least to:
  receive, from a sensing node, location information determined by the sensing node and associated with a user equipment;
  determine one or more radio frequency parameters for the user equipment based on the location information and a map of one or more radio frequency conditions in at least one cell;
  communicate with the user equipment using the one or more determined radio frequency parameters; and
  periodically validate the one or more radio frequency parameters for the user equipment using radio frequency information from at least one other user equipment located within a same cell as the user equipment.

9. The apparatus according to claim 8, wherein the at least one memory and the computer program code are configured to, with the at least one processor, further cause the apparatus at least to:
  revalidate an association between sensing information and the user equipment.

10. The apparatus according to claim 8, wherein the at least one memory and the computer program code are configured to, with the at least one processor, further cause the apparatus, when revalidating the association, at least to:
  revalidate the association if a distance between the user equipment and another sensed object fails to satisfy a threshold.

11. The apparatus according to claim 8, wherein the at least one memory and the computer program code are configured to, with the at least one processor, further cause the apparatus at least to:
  adjust the one or more radio frequency parameters based on one or more parameters specific to the user equipment.

12. The apparatus according to claim 11, wherein the at least one memory and the computer program code are configured to, with the at least one processor, when adjusting the one or more radio frequency parameters, further cause the apparatus at least to:
  adjust the one or more radio frequency parameters based on a sensed orientation and movement of the user equipment.

13. The apparatus according to claim 11, wherein the at least one memory and the computer program code are configured to, with the at least one processor, when adjusting the one or more radio frequency parameters, further cause the apparatus at least to:
  adjust the one or more radio frequency parameters based on object or reflection detections.

14. The apparatus according to claim 11, wherein the at least one memory and the computer program code are configured to, with the at least one processor, when adjusting the one or more radio frequency parameters, further cause the apparatus at least to:
  adjust the one or more radio frequency parameters based on capability information associated with the user equipment.

15. The apparatus according to claim 8, wherein the at least one memory and the computer program code are configured to, with the at least one processor, further cause the apparatus at least to:
  construct the map of the one or more radio frequency conditions.

16. The apparatus according to claim 8, wherein the at least one memory and the computer program code are configured to, with the at least one processor, further cause the apparatus at least to:
  periodically update or check the map based on feedback information from the user equipment or one or more other user equipment.

17. The apparatus according to claim 8, wherein the at least one memory and the computer program code are configured to, with the at least one processor, further cause the apparatus at least to:
  configure the user equipment to operate in a sensing mode.

18. An apparatus, comprising:
at least one processor; and
at least one memory including computer program code, wherein the at least one memory and the computer program code are configured to, with the at least one processor, cause the apparatus at least to:
  receive, from a network node, a configuration associated with operating in a sensing mode;
  communicate with the network node using one or more validated radio frequency parameters that are based on location information associated with the apparatus, which is determined by a sensing node, and a map of one or more radio frequency conditions in at least one cell, wherein the one or more determined radio frequency parameters are periodically validated by the network node using radio frequency information from at least one other apparatus located within a same cell as the apparatus; and
  revert from operating in the sensing mode.

19. The apparatus according to claim 18, wherein the at least one memory and the computer program code are configured to, with the at least one processor, when reverting from operating in the sensing mode, further cause the apparatus at least to:
  revert from operating in the sensing mode based on at least one of:
    signaling from the network node that is based on a measurement report from the apparatus or one or more user equipment, or
    satisfaction of one or more criteria configured for the apparatus.

* * * * *